United States Patent
Patki et al.

(10) Patent No.: US 6,343,321 B2
(45) Date of Patent: *Jan. 29, 2002

(54) METHOD AND APPARATUS FOR NETWORK TRANSPORT INDEPENDENCE

(75) Inventors: Ema Patki, Mountain View; Daniel C. W. Wong, San Jose, both of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,602

(22) Filed: Oct. 27, 1997

(51) Int. Cl.$^7$ .............................................. G06F 15/16
(52) U.S. Cl. ....................... 709/227; 709/228; 709/231; 709/250
(58) Field of Search ................................ 709/231, 230, 709/236, 204, 203, 227, 228, 103, 250

(56) References Cited

U.S. PATENT DOCUMENTS

| | | | | |
|---|---|---|---|---|
| 5,600,579 A | * | 2/1997 | Steinmetz, Jr. | 703/13 |
| 5,674,003 A | * | 10/1997 | Andersen et al. | 709/228 |
| 5,768,513 A | * | 6/1998 | Kuthyar et al. | 709/204 |
| 5,768,527 A | * | 6/1998 | Zhu et al. | 709/231 |
| 5,778,189 A | * | 7/1998 | Kimura et al. | 709/236 |
| 5,899,990 A | * | 5/1999 | Maritzen et al. | 707/103 |
| 5,958,013 A | * | 9/1999 | King et al. | 709/227 |
| 5,983,273 A | | 11/1999 | White et al. | |
| 6,009,469 A | * | 12/1999 | Mattaway et al. | 709/227 |

OTHER PUBLICATIONS

Bocking, "Sockets++: A Uniform Application Programming Interface for Basic–Level Communication Services", IEEE, Dec. 1996.*
Java Media Players, Version 1.0.2, Oct. 14, 1997, Sun Microsystems, Inc., Mountain View, California.

* cited by examiner

Primary Examiner—Ayaz Sheikh
Assistant Examiner—Philip B. Tran
(74) Attorney, Agent, or Firm—The Hecker Law Group

(57) ABSTRACT

Embodiments of the invention make the underlying transport mechanism transparent to the sender and/or receiver. Using embodiments of the invention, it is not necessary for a sender or receiver to interface with the transport mechanism. Messages are received in a single format which eliminates the need for the sender or receiver to accommodate multiple message formats. A socket mechanism implements bi-directional transmissions and acts as a buffer between the sender or receiver and the underlying transport mechanism. The socket mechanism interfaces with a transport delivery mechanism that receives packets from the physical network. The socket forwards messages received from the transport delivery mechanism to a message processor. Further, the socket forwards messages from the message processor to the transport delivery mechanism. The transport deliver mechanism removes a transport header of messages received from and adds a transport header to messages sent to the physical network.

44 Claims, 4 Drawing Sheets

METHOD AND APPARATUS FOR NETWORK TRANSPORT INDEPENDENCE

BACKGROUND OF THE INVENTION

1. Field of the Invention

This invention relates to computer network communications, and more specifically to a method and apparatus for network transport independence.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computers are used to send and receive data with other computers. The Internet is one example of a transport mechanism and other examples include local area networks (LANs) and wide area networks (WANs). Using a network, a software application (a sender) that resides on one computer system can exchange information with another application (a receiver) that resides on a remote computer system, for example. Information is sent via a network in the form of a message. A communication protocol specifies the format of a message.

There are different types of communication protocols each of which has a unique message format. For example, asynchronous transfer mode (ATM), hypertext transfer protocol (HTTP), user datagram protocol (UDP), transmission control protocol (TCP) and real time transport protocol (RTP) each have its own message format.

In a network environment, it may be necessary for the sender and/or receiver to be able to understand more than one communication protocol's message format. For example, a receiver may receive messages from different senders that have different message formats. Further, a single message may be composed using multiple message format. For example, an RTP message may be embedded in a TCP message. The receiver must be able to understand both the TCP and RTP message formats to extract the data contained in the message.

To process a message, a software application must include one or more modules that can parse the message format and extract the information contained in the message. Such modules are needed for each message format that the software application is likely to encounter. This adds to the complexity of the software application which negatively impacts the development and maintenance costs associated with a software application.

SUMMARY OF THE INVENTION

Embodiments of the invention make the underlying transport mechanism transparent to the sender and/or receiver. Using embodiments of the invention, it is not necessary for a sender or receiver to interface with the transport mechanism. Messages are received in a single format which eliminates the need for the sender or receiver to accommodate multiple message formats.

A socket mechanism implements bi-directional transmissions and acts as a buffer between the sender or receiver and the underlying transport mechanism. The socket mechanism interfaces with a transport delivery mechanism that receives packets from the physical network. The socket forwards messages received from the transport delivery mechanism to a message processor. Further, the socket forwards messages from the message processor to the transport delivery mechanism. The transport delivery mechanism removes the transport header from messages received off the network and adds a transport header to messages to be sent over the network.

In one embodiment of the invention, the socket mechanism is comprised of a data channel and a control channel such as those used in an RTP environment. Both the data channel and the control channel include an input stream and an output stream. The input and output streams are push data streams such that the data sender (an originator of the data located on the same or a different host) initiates and controls the flow of the data being transmitted. The socket mechanism interfaces with an RTP session manager (RTPSM), that acts as a message processor in this embodiment, and the transport delivery mechanism A set of object classes are used in one embodiment of the invention to implement the socket mechanism comprised of data and control channels. An RTPIODataSource object class implements the control channel. A subclass of the RTPIODataSource object class, an RTPSocket class, implements the data channel. The RTPIODataSource and RTPSocket provide bi-directional data flow that can receive data for as well as receive data from the RTPSM.

The data and control channels each contain an output stream that implement a PushSourceStream interface and an input stream that implements a PushDestStream interface. The output stream sources data from the underlying transport mechanism to the RTPSM while the input stream receives data from the RTPSM and forwards it to the underlying delivery mechanism. In this manner all details of the underlying transport are hidden from the RTPSM.

DETAILED DESCRIPTION OF THE INVENTION

A method and apparatus for network transport independence is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
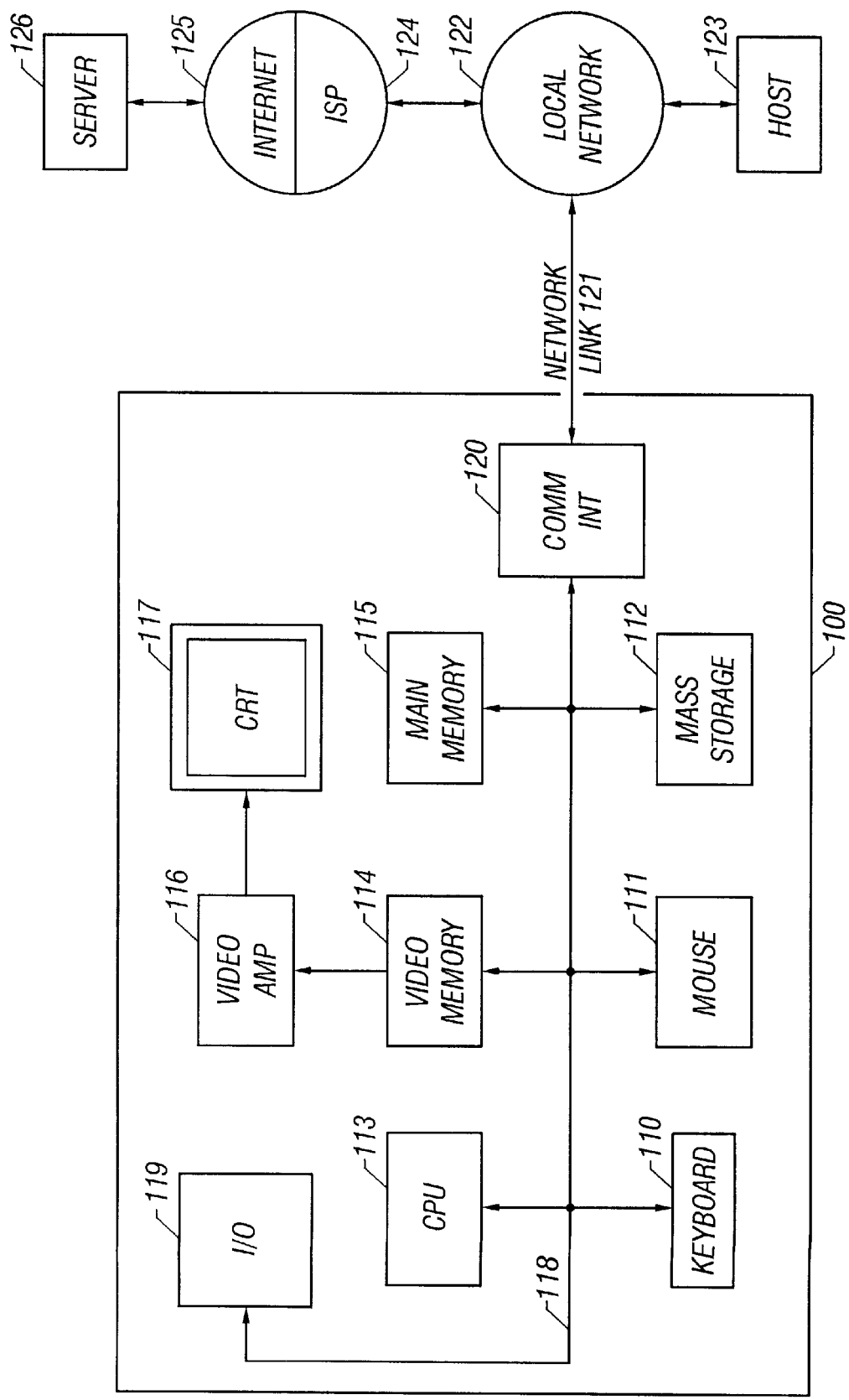
FIG. 1 is a block diagram of an embodiment of a computer system capable of providing a suitable execution environment for an embodiment of the invention.

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the Method and Apparatus for Network Transport Independence described herein.

The received code may be executed by CPU 113 as it is received, and/or stored in mass storage 112, or other non-volatile storage for later execution. In this manner, computer 100 may obtain application code in the form of a carrier wave.

The computer system described above is for purposes of example only. An embodiment of the invention may be implemented in any type of computer system or programming or processing environment.

Overview

Information can be transmitted using a transport mechanism that consists of a physical network and a protocol for transmitting a message via the physical network. The physical network can be, for example, a local area network (LAN), wide area network (WAN) or the Internet. A communication protocol specifies the format of the message that is sent over the network. A message format is standardized such that both a sending software application (sender) and a receiving software application (recipient) can interpret a message generated using a communication protocol's message format.

Before a message can be sent, the sender generates a message using a message format. A message typically contains a header portion and a data portion. The header includes information about the data portion such as the data's type and length. The header may also include information that identifies the source and/or destination of the message (e.g., network address) and sequencing information (i.e., the number of the message in a series of messages). The receiver may use the header information to determine whether the message is intended for the receiver. If so, the receiver can use the header to extract the data and, if the data is part of some larger piece of data, combine the data.

There are different types of communication protocols each of which has a unique message format. For example, asynchronous transfer mode (ATM), hypertext transfer protocol (HTTP), user datagram protocol (UDP), transmission control protocol (TCP) and real time transport protocol (RTP) each have its own message format.

In a network environment, it may be necessary for the sender and/or receiver to be able to understand more than one communication protocol's message format. For example, a receiver may receive messages from different senders that have different message formats. Further, a single message may be composed using multiple message format. For example, an RTP message embedded in a TCP message. The receiver must be able to understand both the TCP and RTP message formats to extract the data contained in the message.

Figure 2:
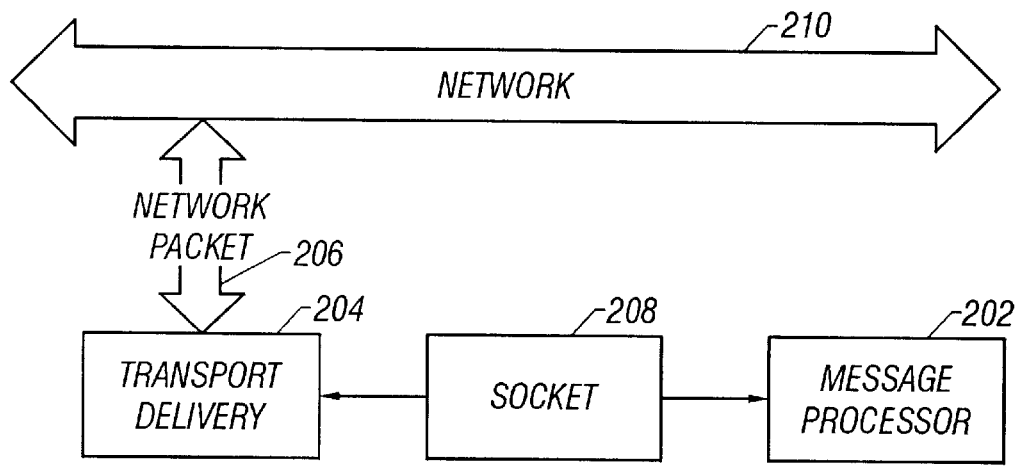
FIG. 2 illustrates an overview of message flow and message processing according to an embodiment of the invention.

Embodiments of the invention make the underlying transport mechanism transparent to the sender and/or receiver. Using embodiments of the invention, it is not necessary for a sender or receiver to interface with the transport mechanism. A message is always in a single format which eliminates the need for the sender or receiver to understand multiple message formats. FIG. 2 illustrates an overview of message flow and message processing according to an embodiment of the invention.

Network 210 is the physical network such as a LAN, WAN or the Internet. Network packet 206 is a message that is being transmitted via network 210. If network packet 206 is a message that is received from network 210, it is received by transport delivery module 204. If network packet 206 comprises multiple protocols such as when one packet is embedded within another packet (e.g., an RTP packet is embedded within an ATM packet), transport delivery 204 extracts the inner packet embedded within the outer packet.

The message is forwarded from transport delivery 204 to socket 208. Socket 208 represents a two-way data message transmitter that provides a buffer between message processor 202 and the underlying transport mechanism. Message processor 202 can be either a sender or receiver of messages, or both. To receive a message from network 210, transport delivery 204 removes the transport header and forwards the RTP packet to socket 208 which forwards it to a message processor 202.

If message processor 202 generates a message, it sends the message to socket 208 which forwards the message to transport delivery 204. Transport delivery 204 creates network packet 206 from the message (e.g., embeds the message within a transport header) and sends it out on network 210.

There can be multiple instances of transport delivery 204 each of which is capable of generating network packet 206 using a communication protocol's message format. A connection is formed between transport delivery 204 and an instance of socket 208. A connection is also created between an instance of socket 208 and an instance of message processor 202.

In one embodiment of the invention, socket 208 is an RTPSocket that interfaces with transport delivery 204 and message processor 202 to process RTP messages. In this embodiment, message processor 202 acts as an RTP session manager. During an RTP session real time data such as audio or video data is generated, for example. An RTP packet contains the real time data (i.e., a data portion of the RTP packet) and a header portion.

The header portion includes payload information that identifies the type of real time data contained in the RTP packet. The payload information can specify that the RTP packet contains video data, for example. Video data that constitutes a movie, for example, can be contained in multiple RTP packets. The header portion of the RTP packet also includes sequencing information that identifies the order in which each packets data portion is to be replayed.

Figure 3:
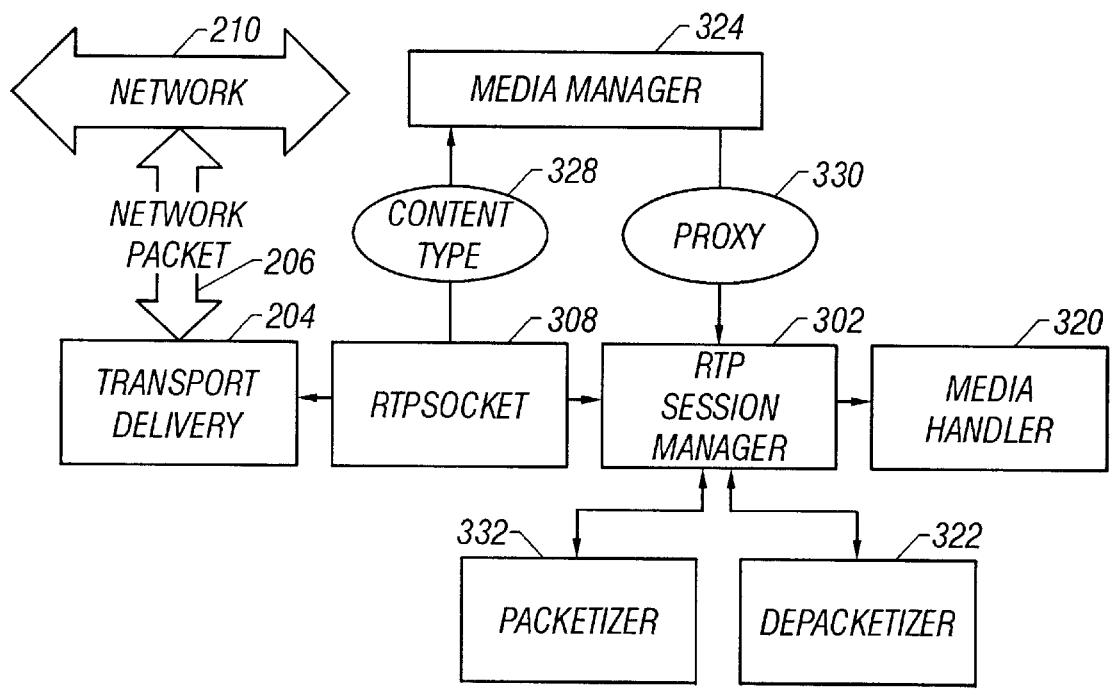
FIG. 3 illustrates an overview of an RTP environment according to an embodiment of the invention.

FIG. 3 illustrates an overview of an RTP environment according to an embodiment of the invention. RTP session manager (RTPSM) 302 manages the operations involved in the creation and/or output of real time data. For example, RTPSM 302 manages the flow of the real time data to media player 320 for output to a display. Further, RTPSM 302 forwards RTP packets received from RTPSocket 308 to depacketizer 322 to extract the real time data and assemble the data into data frames. The data frames are forwarded to RTPSM 302 which forwards them to media handler 320.

In one embodiment of the invention, before an instance of RTPSM 302 is created to manage each real time data session an RTPSocket 308 instance is created and its content type is set (e.g., RTP raw audio or RTP raw video). RTPSocket 308 is handed to media manager 324 which creates an instance of RTPSM 302 based on the content type specified in RTPSocket 308. For example, if the content type indicates that the data contained in the RTP packet is video data, an instance of RTP session manager 324 that is capable of managing the video data is created. Media manager 324 provides proxy 326 to RTPSM 302 as a handle to RTPSocket 308.

Network 210 transmits network packet 206 to transport delivery 204. Network packet 206 includes an embedded RTP packet inside another packet (e.g., an ATM, HTTP, UDP or TCP packet). Transport delivery 204 receives the incoming network packet 206 and removes the transport header portion of network packet 206 to generate an RTP packet.

The incoming RTP packet is forwarded to RTPSocket 308 which forwards it to RTPSM 302. RTPSM 302 sends the RTP packet received from network 210 via RTPSocket 308 to depacketizer 322 to extract the incoming real time data and assemble the data frame. The assembled data frame is sent back to RTPSM 302 which forwards it to media player 320 for display.

An outgoing data frame is processed in the reverse manner. A data frame is received by RTPSM 302 and forwarded to packetizer 332 for inclusion in one or more RTP packets. An outgoing RTP packet is sent back to RTPSM 302 and then forwarded by RTPSM 302 to RTPSocket 308. RTPSocket 308 forwards the outgoing RTP packet to transport delivery 204 to generate network packet 206 (e.g., add a transport header such as a UDP, HTTP or ATM header) which is sent out over network 210.

Figure 4:
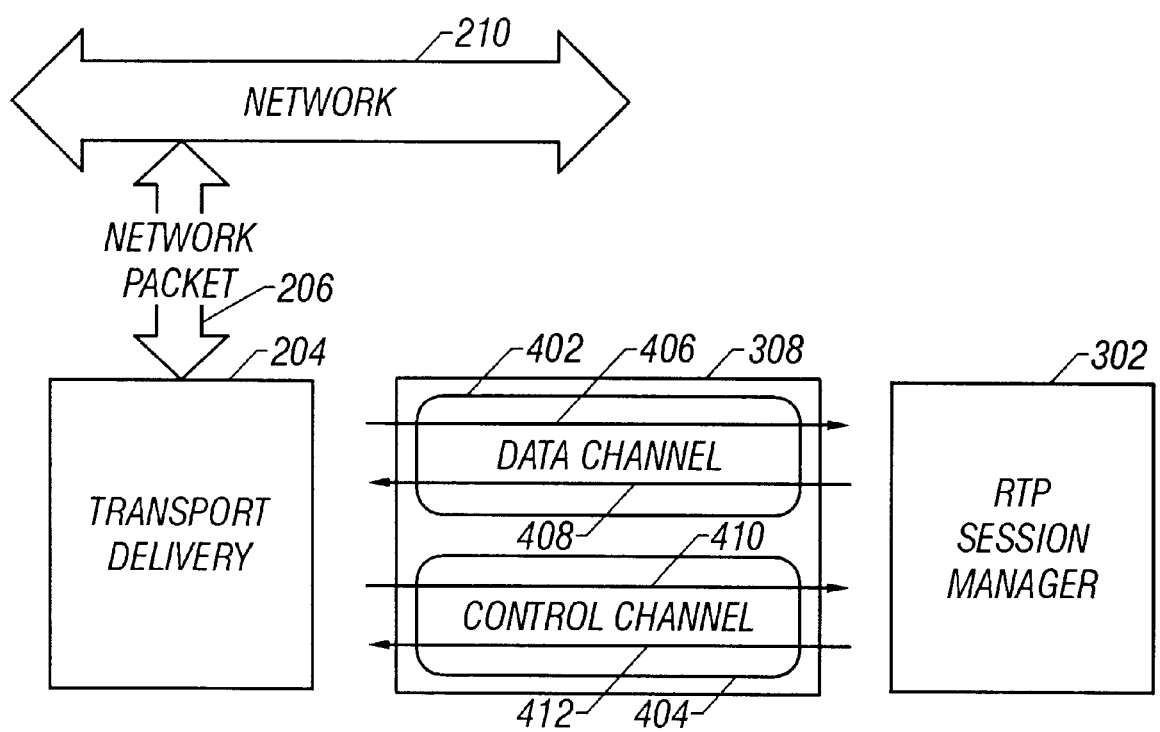
FIG. 4 provides an illustration of a socket comprising a data channel and a control channel according to an embodiment of the invention.

An RTP message can be either a control message that contains control information or a data message that contains data (e.g., video or audio data). RTPSocket 308 includes both a data channel for forwarding data messages and a control channel for forwarding control messages. FIG. 4 provides an illustration of a socket comprising a data channel and a control channel according to an embodiment of the invention.

Data channel 402 of RTPSocket 308 transmits RTP data packets between RTPSM 302 and network 210 via transport delivery 204. RTPSocket 308's control channel 404 transmits RTP control packets between RTPSM 302 and network 210. Data channel 402 and control channel 404 include output streams 406 and 410 (respectively) and input streams 408 and 412 (respectively).

An RTP data packet received from network 210 is forwarded to RTPSM 302 via output stream 406 of RTPSocket 308's data channel 402. An RTP data packet sent by RTPSM 302 is transmitted to network 210 via input stream 408 of RTPSocket 308's data channel 402. An RTP control packet is transmitted to network 210 from RTPSM 302 via input stream 412 of RTPSocket 308's control channel 404. Output stream 410 of RTPSocket 308's control channel 404 forwards an RTP control packet from network 210 to RTPSM 302.

Object-Oriented Programming Languages

In one or more embodiments of the invention, RTPSocket 308 is implemented as a set of objects in an object-oriented programming language such as Java®.

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

Object-oriented programming languages are predominantly based on a "class" scheme. A class provides a definition for an object that typically includes both instance variables and methods. An object class is used to create a particular instance of an object. An instance of an object class includes the variables and methods defined for the class. Multiple instances of a the same class can created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

In addition to the class hierarchy, some object-oriented programming languages (e.g., Java) provide the ability to group object classes and define a hierarchy among the groupings. For example, in Java, a package is a collection of classes. Packages can be nested to form a hierarchy.

Data and Control Channel Classes

A DataSource object class manages the transmission of information. In an embodiment of the invention, information is transmitted as streams. A DataSource is either a pull DataSource or a push DataSource depending on whether it manages a pull data stream or a push data stream. A pull data stream allows a data requester to initiate and control the flow of data transferred via the pull data stream. With a push data stream, the data sender initiates data transfer and controls the flow of data transferred via the push data stream. A push DataSource is typically used for real time data such as video-on-demand (VOD) data.

In an embodiment of the invention, data channel 402 and control channel 404 are push DataSources that manage push data streams. Data channel 402 and control channel 404 are bi-directional DataSources. That is, data channel 402 and control channel 404 have an output data stream and an input data stream. Data that flows in or out of data channel 402 or control channel 404 is a stream of bytes in the form of an RTP packet, for example.

The following table identifies methods of a push DataSource object class referred to as an RTPIODataSource object class, according to an embodiment of the invention.

| Example RTPIODataSource Object Class Methods | |
|---|---|
| Method | Description |
| connect( ) | Sets boolean to true. |
| disconnect( ) | Sets boolean to false. |
| getContentType( ) | Retrieves the type description for the media provided via the DataSource. |
| getInputStream( ) | Identifies the DataSource's input stream. |
| getOutputStream( ) | Identifies the DataSource's output stream. |
| getStreams( ) | Get the collection of streams managed the DataSource. |
| isStarted( ) | Specifies whether the DataSource has been started. |
| setContentType( ) | Sets type description for media provided via the DataSource. |
| setInputStream( ) | Sets an input stream for the DataSource. |

| Example RTPIODataSource Object Class Methods | |
|---|---|
| Method | Description |
| setOutputStream( ) | Sets an output stream for the DataSource. |
| start( ) | Initiates data transfer. |
| stop( ) | Stops data transfer. |

Control channel 404 is an instance of the RTPIODataSource object. Data channel 402 is an instance of an RTPSocket object class which is a subclass of the RTPIODataSource object class. Data channel 402 extends the methods of the RTPIODataSource object and implements a GetControlChannel method which returns the identity of RTPSocket 308's control channel (i.e., control channel 404). The following table identifies methods of the RTPSocket object class, according to an embodiment of the invention.

| Example RTPSocket Object Class Methods | |
|---|---|
| Method | Description |
| connect( ) | Sets boolean to true and calls the control channel's connect method. |
| disconnect( ) | Sets boolean to false and calls the control channel's disconnect method. |
| getContentType( ) | Retrieves the type description for the media provided via the DataSource. |
| getControlChannel( ) | Returns the control channel associated with the data channel. |
| getInputStream( ) | Returns the DataSource's input stream. |
| getOutputStream( ) | Returns the DataSource's output stream. |
| getStreams( ) | Get the collection of streams managed the DataSource. |
| isStarted( ) | Specifies whether the DataSource has been started. |
| setContentType( ) | Sets media type description and calls same control channel method. |
| setInputStream( ) | Sets an input stream for the DataSource. |
| setOutputStream( ) | Sets an output stream for the DataSource. |
| start( ) | Initiates data transfer and calls same control channel method. |
| stop( ) | Stops data transfer and calls same control channel method. |

As part of its initialization, RTPSocket 308 creates an instance of RTPIODataSource for control channel 404. The control channel RTPIODataSource instance can be accessed via methods of the data channel RTPSocket instance. Methods of the data channel RTPSocket instance call similar methods on the control channel RTPIODataSource instance. For example, if a connect method call is invoked on the data channel RTPSocket instance, the method calls the connect method on the control channel RTPIODataSource instance. Similarly, disconnecting, starting and stopping the RTPSocket will cause the same operation to be performed for the control channel RTPIODataSource instance. Thus, a single call to these methods on the RTPSocket instance results in an automatic call to the same-named method on the RTPIODataSource instance. In this embodiment, the setInputStream and setOutputStream methods are invoked separately for the RTPSocket (data channel) and RTPIODataSource (control channel) instances.

Data Streams

Output streams 406 and 410 and input streams 408 and 412 transmit data in streams (e.g., once it is begun, the flow of data is continuous). In one embodiment of the invention, data channel 402 and control channel 404 each contain an output stream that implements a PushSourceStream interface and an input stream that implements a PushDestStream interface. The following table identifies the methods of a pushSourceStream interface implemented by an output stream used in one embodiment.

Embodiment of a pushSourceStream Interface

| Method | Description |
| --- | --- |
| endOfStream( ) | Specifies whether the end of the stream has been reached; It returns true, if there is no more data. |
| getContentDescriptor( ) | Retrieves the type description for the media sent via this stream. |
| getContentLength( ) | Retrieves the size in bytes of the content on this stream, LENGTH_UNKNOWN is returned if the length is not known. |
| getMinimumTransferSize( ) | Returns the size of the buffer needed for the streaming transfer. |
| read( ) | Reads a specified number of bytes into a specified buffer at a specified location in the buffer. Returns the number of bytes read or −1 when the end of the media is reached. |
| setTransferHandler( ) | Specifies the destination or data handler to which the data is to be transferred. |

The setTransferHandler method of output stream 406 is called to register RTPSM 302 as the destination of the data being streamed by output stream 406, for example. The getMinimumTransferSize method can be called to determine the minimum size of the buffer needed to store the data stream. The getContentLength can be called to determine the size of the data that is to be streamed. To send the data, the read method is called and a buffer is specified from which the data can be read. An offset at which the data is stored in the buffer and length of data to be read is also specified. A "−1" value is returned when the end of the data is reached.

Input streams 408 and 412 implement a pushDestinationStream interface. The pushDestinationStream interface implements a write method that specifies the buffer from which input streams 408 and 412 copy the data (e.g., the data contained in the buffer is copied to a network buffer). The offset and length information specifies the location at which and the amount of data to be written.

Processing Flow Example

The data channel 402 and control channel 404 represent a two way data source. That is, data channel 402 and control channel 404 act as a data source and a data sink for RTPSM 302. Both data channel 402 and control channel 404 contain an output stream of type PushSourceStream (e.g., output streams 406 and 410, respectively) and an input stream of type PushDestStream (e.g., input streams 408 and 412). An output stream acts as a source of data from the underlying transport to RTPSM 302. An input stream acts as a receiver of data from RTPSM 302 to the underlying transport. It is not necessary for RTPSM 302 to have knowledge of any of the aspects of the underlying transport.

RTPSocket 308's data channel 402 and control channel 404 are created to act as an interface for RTPSM 302 to the underlying transport. In one embodiment of the invention, data channel 402 is created as an instance of RTPSocket 308 which creates an instance of RTPIODataSource for control channel 404. Input and output streams of data channel 402 and control channel 404 are specified and a handle to the RTPSocket instance is handed to RTPSM 302.

To send a message to RTPSM 302 a client streams the message (e.g., control or data message) to RTPSocket 308. RTPSocket 308 forwards the message to RTPSM 302. Similarly, RTPSM 302 streams a message (e.g., data or control) to RTPSocket 308 which forwards the message to the client.

Figure 5:
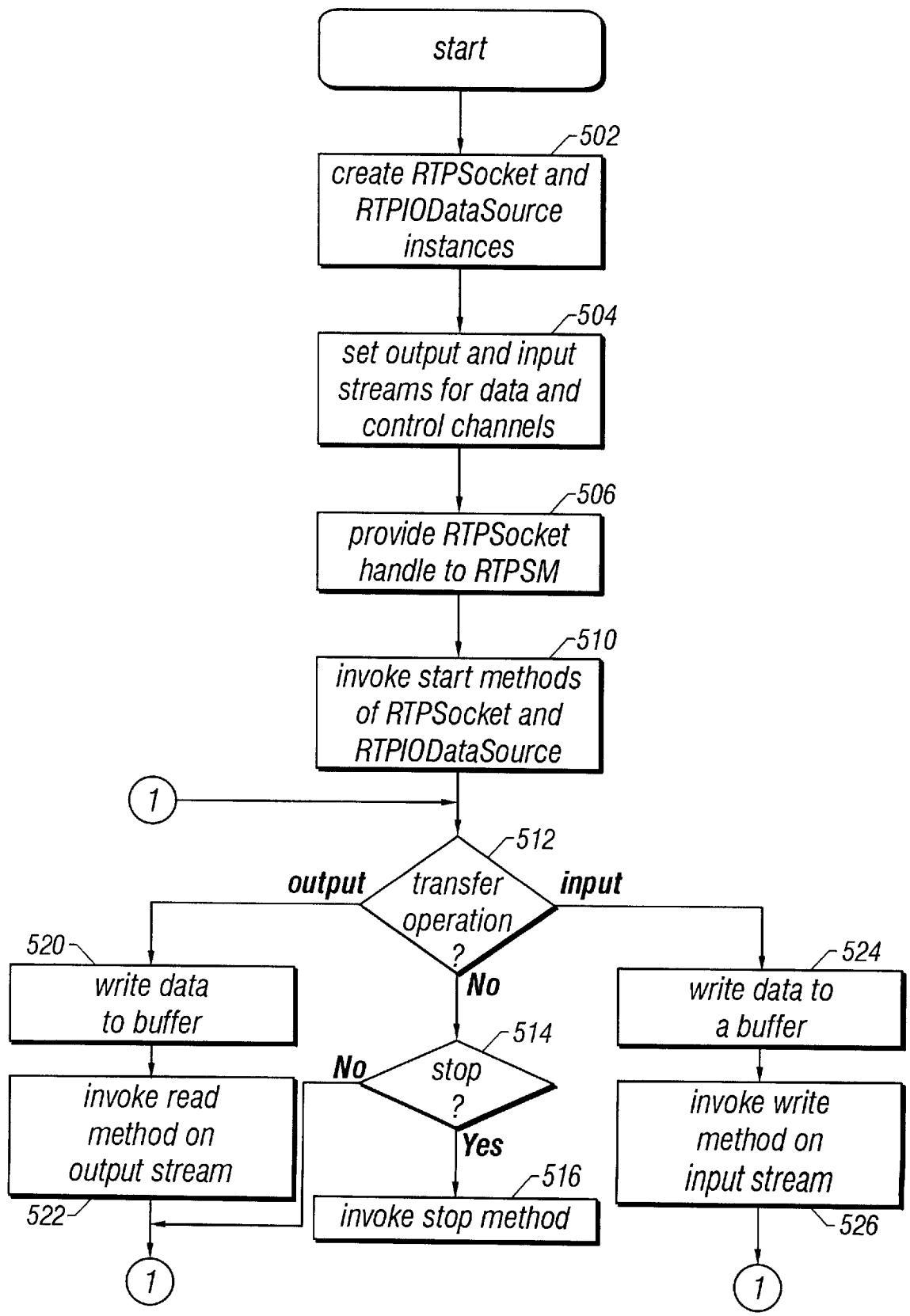
FIG. 5 provides a process flow for sending/receiving messages according to an embodiment of the invention.

FIG. 5 provides a process flow for sending/receiving messages according to an embodiment of the invention. At step 502 the RTPSocket and RTPIODataSource instances are created. In this embodiment, the RTPSocket constructor invokes the RTPIODataSource constructor as part of the creation of the RTPSocket instance. At step 504, the input and output streams are set for the RTPSocket and RTPIODataSource instances. At step 506, a handle to the RTPSocket instance is provided to RTPSM 302. At step 510, the start method is invoked for the RTPSocket and RTPIODataSource instances. In this embodiment, the start method of the RTPSocket instance invokes the start method of the RTPIODataSource instance.

Steps 520–522 and 524–526 are used to transmit a message from and to RTPSM 302. If at step 512, an input message (i.e., a message being input to network 210 from RTPSM 302) is being transmitted, steps 524–526 are performed. If it is an output message (i.e., a message that is output from network 210 to RTPSM 302), steps 520–522 are performed. If a stop operation is determined at step 514, a stop method of the RTPSocket instance is invoked which invokes a stop method of the RTPIODataSource instance.

To transmit a message on the network, RTPSM 302 writes the message to a data buffer at step 524. RTPSM 302 calls a write method of the output stream (e.g., output streams 406 or 410) specifying the data buffer and the location of the data within the data buffer at step 526. Processing continues at step 512 to process any subsequent messages.

To receive a message from the network, transport delivery 204 writes the message to a data buffer at step 520. Transport deliver 204 calls a read method of the input stream (e.g., input steam 408 or 412) specifying the data buffer and the location of the data within the data buffer at step 522. Processing continues at step 512 to process any subsequent messages.

Appendix A provides an example of an RTP over UDP player which will receive RTP UDP packets and stream them to an RTPSM using one or more embodiments of the invention.

Thus, a method and apparatus for network transport independence has been provided in conjunction with one or more specific embodiments. The invention is defined by the claims and their full scope of equivalents.

AFFENDIX A import javax.media.rtp.*;
import javax.media.*;
import javax.media.protocol.*;
import java.io.*;

AFFENDIX A

```
import java.net.*;
import cpm.sun.media.ui.*;
/**
 * A RTP over UDP player which will receive RTP UDP packets and stream
 * them to the JMF RTP Player or (RTPSM) which is not aware of the
 * underlying network/transport protocol
 */
public class GenericRTPPlayer{
    // our main rtpsocket abstraction to which we will create and send
    // to the Manager for appropriate handler creation
    RTPSocket rtpsocket = null;
    // the control RTPIODataSource of the RTPSocket above
    RTPIODataSource rtcpsource = null;
    // The GUI to handle our player
    PlayerWindow playerWindow;
    // The handler created for our RTP session, as returned by the Manager
    Player player;
    // maximum size of buffer for UDP receive from the sockets
    private int maxsize = 2000;
    public static void main(String[] args){
    new GenericRTPPlayer();
    }
    public GenericRTPPlayer(){
        // create the RTPSocket
        rtpsocket = new RTPSocket();.
        // set its content type : rtpraw/video for a video session and
        // rtpraw/audio for an audio session
        rtpsocket.setContentType("rtpraw/video");
        // set the RTP Session address and port of the RTP data
        UDPHandler rtp = new UDPHandler("224.144.251.104", 49152);
        // set the above UDP Handler to be the sourcestream of the rtpsocket
        rtpsocket.setOutputStream(rtp);
        // set the RTP Session address and port of the RTCP data
        UDPHandler rtcp = new UDPHandler("224.144.251.104", 49153);
        // get a handle over the RICP Datasource so that we can set
        // the sourcestream and deststream of this source to the rtcp
        // udp handler we created above.
        rtcpsource = rtpsocket.getControlChannel();
        rtcpsource.setOutputStream(rtcp);
        rtcpsource.setInputStream(rtcp);
        // start & connect the RTP socket data source before creating
        // the player
        try{
            rtpsocket.connect();
            rtpsocket.start();
            player = Manager.createPlayer(rtpsocket);
        }catch (NoPlayerException e){
            System.out.println(e.getMessage());
        }
        catch (IOException e){
            System.out.println(e.getMessage());
        }
        // send this player to out playerwindow
        playerWindow = new PlayerWindow(player);
    }
    // method used by inner class UDPHandler. to open a datagram or
    // multicast socket as the case maybe
    private DatagramSocket InitSocket(String address, int port){
        InetAddress addr = null;
        DatagramSocket sock = null;
        try{
            addr = InetAddress.getByName(address);
            if (addr.isMulticastAddress()){
                MulticastSocket msock = new MulticastSocket(port);
                msock.joinGroup(addr);
                sock = (DatagramSocket)msock;
            }else{
            sock = new
                DatagramSocket(port,addr);.
            }
            return sock;
        }
        catch (SocketException e){
            return null;
        }
            catch (UnknownHostException e){
                return null;
```

-continued

AFFENDIX A

```
}
    catch (IOException e){
        return null;
    }
}// end of InitSocket
// INNER CLASS UDPHandler which will receice UDP RTP Packets and
// stream them to the handler of the sources stream. IN case of
// RTCP, it will also accept RTCP packets and send them on the
// underlying network.
public class UDPHandler extends Thread
implements PushSourceStream; PushDestStream{
    Thread thread = null;
    DatagramSocket sock = null;
    DatagramPacket dp = null;
        SourceTransferHandler outputhandler = null;
    String address = null;
    int port;
    public UDPHandler(String address, int port){
        this.address = address;
        this.port = port;
        thread = new Thread(this);
        thread.setDaemon(true);
        thread.start();
        sock = InitSocket(address,port);
    }
    public void run(){
        int len;
        while(true){
            try{
                do{
                    dp = new DatagramPacket(new byte[maxsize],maxsize);
                    sock.receive(dp);
                    len = dp.getLength();
                    if (len >(maxsize >> 1))
                        maxsize = len << 1;
                }
                while (len >= dp.getData().length);
            }catch (IOException e){
            }
            if (outputhandler != null)
                outputhandler.transferData(this);
        }
    }
    // methods of PushSourceStream
    public Object[] getcontrols() {
        return new Object[0];
    }
        public Object getControl(String controlName){
        return null;
    }
        public ContentDescriptor getContentDescriptor(){
        return null;
    }
        public long getContentLength(){
        return SourceStream.LENGTH_UNKNOWN;
    }
        public boolean endOfStream(){
        return false;
    }
    public int read(byte buffer[],
                int offset,
                int length){
        System.arraycopy(dp.getData(),
                0,
                buffer,
                offset,
                dp.getLength());
        return dp.getData().length;
    }
    public int getMinimumTransferSize(){
        return dp.getLength();
    }
        public void setTransferHandler(SourceTransferHandler
transferHandler){
        this.outputhandler = transferHandler;
    }
    // methods of PushDestStream
```

-continued

APPENDIX A

```
        public int write(byte[] buffer,
                    int offset,
                    int length){
            InetAddress addr = null;
            try{
                addr = InetAddress.getByName(address);
                }catch (UnknownHostExcephon e){
            }
            DatagramPacket dp = new DatagramPacket(buffer,length,addr,port);
            try{
                sock.send(dp);
            }catch (IOException e){}
            return dp.getLength();
        }
    }
}// end of Test
```

What is claimed is:

1. In a computer system, a method of network transport independence comprising:

obtaining a first socket instance;

connecting said first socket to a first message processor, wherein said first socket to first message processor connection comprises at least one channel that has a real time data input stream flowing from said first message processor into said first socket and a real time data output stream flowing from said first socket into said first message processor;

connecting said first socket to a network;

creating a plurality of real time transport protocol packets from said real time data input stream of said at least one channel of said first socket;

embedding said plurality of real time transport protocol packets into a plurality of network packets, wherein said network packets comprise at least one additional communication protocol;

transporting said network packets using said additional communication protocol from said first socket onto said network and from said network to a second socket;

reassembling said real time data input stream of said at least one channel of said first socket at said second socket using said plurality of real time transport protocol packets, wherein said reassembling is independent of said at least one additional communication protocol.

2. The method of claim 1 wherein said step of connecting said first socket to said network further comprises the steps of:

connecting said network to a first transport delivery mechanism;

connecting said first transport delivery mechanism to said first socket.

3. The method of claim 2 wherein said first transport delivery mechanism forwards a message from said first socket to said network, and wherein said embedding is performed by said first transport delivery mechanism.

4. The method of claim 2 wherein said first transport delivery mechanism forwards a received message from said network to said first socket, said method further comprising the step of removing a real time transport protocol packet from said received message.

5. The method of claim 1 wherein said at least one channel comprises at least one data channel, said at least one data channel transmitting data messages.

6. The method of claim 1 wherein said at least one channel comprises at least one control channel, said at least one control channel transmitting messages containing control information.

7. The method of claim 1 wherein said at least one channel comprises at least one data channel to transmit data messages and at least one control channel to transmit control messages.

8. The method of claim 7 wherein said step of creating a plurality of real time transport protocol packets further comprises the steps of:

said first message processor specifying a buffer that contains said real time transport protocol packet;

said read time data input stream copying said real time transport protocol packet in said buffer to a network buffer.

9. The method of claim 7 wherein said step of transporting further comprises the steps of:

specifying a buffer that contains said transported network package to a real time data output stream of said second socket;

said real time data output stream copying said transported network package in said buffer to a buffer accessible by a second message processor.

10. The method of claim 1 wherein said real time transport protocol packets comprise information identifying at least one data type associated with said real time data input stream and sequencing information associated with said reassembling.

11. The method of claim 1 wherein said creating further comprises parsing said real time data input stream into said plurality of real time transport protocol packets.

12. The method of claim 10 wherein said reassembling further comprises constructing a real time data output stream at said second socket from said transported network packets in accordance with said information identifying at least one data type and sequencing information.

13. A network transport system comprising:

a first socket instance coupled to a first message processor and to a network;

at least one channel comprising a real time data input stream flowing from said first message processor into said first socket and a real time data output stream flowing from said first socket into said first message processor;

a plurality of network packets for transporting from said first socket onto said network and from said network to a second socket using at least one additional protocol, wherein said network packets comprise a plurality of real time transport protocol packets created from said read time data input stream of said at least one channel of said first socket;

a real time data output stream of said second socket comprising said real time data input stream of said at least one channel of said first socket reassembled using said plurality of real time transport protocol packets, wherein said reassembling is independent of said at least one additional communication protocol.

14. The system of claim 13 wherein said first socket comprises a first transport delivery mechanism coupled to said network, wherein said first transport delivery mechanism embeds said plurality of real time transport protocol packets into said network packets and transports said network packets onto said network.

15. The system of claim 14 wherein said real time data input stream and said real time data output stream are object-oriented programming language objects.

16. The system of claim 14 wherein said at least one channel comprises a data channel.

17. The system of claim 14 wherein said at least one channel comprises a control channel.

18. The system of claim 14 wherein said at least one channel comprises a data channel and a control channel.

19. The system of claim 14, wherein a second transport delivery mechanism coupled to said network removes said plurality of real time transport protocol packets from said network packets.

20. The system of claim 13 wherein said network is the Internet.

21. The system of claim 13 wherein said first and second sockets are object-oriented programming language objects.

22. The system of claim 13 wherein said real time transport protocol packets comprise information identifying at least one data type associated with said real time data input stream and sequencing information associated with said reassembling.

23. The system of claim 22 wherein said reassembling further comprises constructing a real time data output stream at said second socket from said transported network packets in accordance with said information identifying at least one data type and sequencing information.

24. An article of manufacture comprising:
a computer usable medium having computer readable program code embodied therein configured to allow transport independence comprising:
computer readable code configured to cause a computer to obtain a first socket instance;
computer readable code configured to cause a computer to connect said first socket to a first message processor, wherein said first socket to first message processor connection comprises at least one channel that has a real time data input stream flowing from said first message processor into said first socket and a real time data output stream flowing from said first socket into said first message processor;
computer readable code configured to cause a computer to connect said first socket to a network;
computer readable code configured to cause a computer to create at least one network message from said input stream of said at least one channel of said socket;
computer readable code configured to cause a computer to create a plurality of real time transport protocol packets from said real time data input stream of said at least one channel of said first socket;

computer readable code configured to embed said plurality of real time transport protocol packets into a plurality of network packets, wherein said network packets comprise at least one additional communication protocol;;
computer readable code configured to cause said computer to transport said network packets using said additional communication protocol from said first socket onto said network and from said network to a second socket;
computer readable code configured to reassemble said real time data input stream of said at least one channel of said first socket at said second socket using said plurality of real time transport protocol packets, wherein said reassembling is independent of said at least one additional communication protocol.

25. The article of manufacture of claim 24 wherein said computer readable code configured to cause a computer to connect said first socket to said network further comprises:
computer readable code configured to cause a computer to connect said network to a first transport delivery mechanism;
computer readable code configured to cause a computer to connect said first transport delivery mechanism to said first socket.

26. The article of manufacture of claim 25 wherein said first transport delivery mechanism forwards a message from said first socket to said network.

27. The article of manufacture of claim 25 wherein said first transport delivery mechanism forwards a received message from said network to said first socket, said article of manufacture further comprises computer readable code configured to cause a computer to remove a real time transport protocol packet from said received message.

28. The article of manufacture of claim 24 wherein said at least one channel comprises at least one data channel, said at least one data channel transmitting data messages.

29. The article of manufacture of claim 24 wherein said at least one channel comprises at least one control channel, said at least one control channel transmitting messages containing control information.

30. The article of manufacture of claim 24 wherein said at least one channel comprises at least one data channel to transmit data messages and at least one control channel to transmit control messages.

31. The article of manufacture of claim 30 wherein said computer readable code configured to cause a computer to create a plurality of real time transport protocol packets further comprises:
computer readable code configured to cause a computer to specify a buffer that contains said real time transport protocol packets;
computer readable code configured to cause a computer to cause a computer to copy said real time transport protocol packets in said buffer to a network buffer.

32. The article of manufacture of claim 30 wherein said computer readable code configured to cause a computer to transport network packets further comprises:
computer readable code configured to cause a computer to specify a buffer that contains said transported network package to said real time data output stream of said second socket;
computer readable code configured to cause a computer to copy said transported network packet in said buffer accessible by a second message processor.

33. The article of claim 24 wherein said real time transport protocol packets comprise information identifying at least one data type associated with said real time data input stream and sequencing information associated with said reassembling.

34. The article of claim 24 wherein said computer readable code configured to create a plurality of real time transport protocol packets further comprises computer readable code configured to parse said real time data input stream into said plurality of real time transport protocol packets.

35. The method of claim 33 wherein said computer readable code configured to reassemble further comprises computer readable code configured to construct a real time data output stream at said second socket from said transported network packets in accordance with said information identifying at least one data type and sequencing information.

36. A computer data signal embodied in a carrier wave and representing sequences of instructions which, when executed by a processor, cause said processor to provide network transport independence by performing the steps of:
  creating a first socket instance;
  connecting said first socket to a first message processor, wherein said first socket to first message processor connection comprises at least one channel that has a real time data input stream flowing from said first message processor into said first socket and a real time data output stream flowing from said first socket into said first message processor;
  connecting said first socket to a network;
  creating a plurality of real time transport protocol packets from said real time data input stream of said at least one channel of said first socket;
  embedding said plurality of real time transport protocol packets into a plurality of network packets, wherein said network packets comprise at least one additional communication protocol;
    transporting said network packets using said additional communication protocol from said first socket onto said network and from said network to a second socket;
  reassembling said real time data input stream of said at least one channel of said first socket at said second socket using said plurality of real time transport protocol packets, wherein said reassembling is independent of said at least one additional communication protocol.

37. The computer data signal of claim 36 wherein said step of connecting said first socket to said network further comprises the steps of:
  connecting said network to a first transport delivery mechanism;
  connecting said first transport delivery mechanism to said first socket.

38. The computer data signal of claim 37 wherein said first transport delivery mechanism forwards a message from said first socket to said network, and
  wherein said sequences of instructions which, when executed by said processor, cause said first transport delivery mechanism to perform said step of said embedding.

39. The computer data signal of claim 37 wherein said first transport delivery mechanism forwards a received message from said network to said first socket, and
  wherein said sequences of instructions which, when executed by said processor, cause said first transport delivery mechanism to perform the further step of removing a real time transport protocol packet from said received message.

40. The computer data signal of claim 36 wherein said at least one channel comprises at least one data channel, said at least one data channel transmitting data messages.

41. The computer data signal of claim 36 wherein said at least one channel comprises at least one control channel, said at least one control channel transmitting messages containing control information.

42. The computer data signal of claim 36 wherein said at least one channel comprises at least one data channel to transmit data messages and at least one control channel to transmit control messages.

43. The computer data signal of claim 42 wherein said step of creating a plurality of real time transport protocol packets further comprises the steps of:
  said first message processor specifying a buffer that contains said real time transport protocol packet;
  said real time data input stream copying said real time transport protocol packet in said buffer to a network buffer.

44. The computer data signal of claim 42 wherein said step of transporting further comprises the steps of:
  specifying a buffer that contains said transported network packet to a real time data output stream of said second socket;
  said real time data output stream copying said transported network packet in said buffer to a buffer accessible by a second processor.

* * * * *